Figure 1:
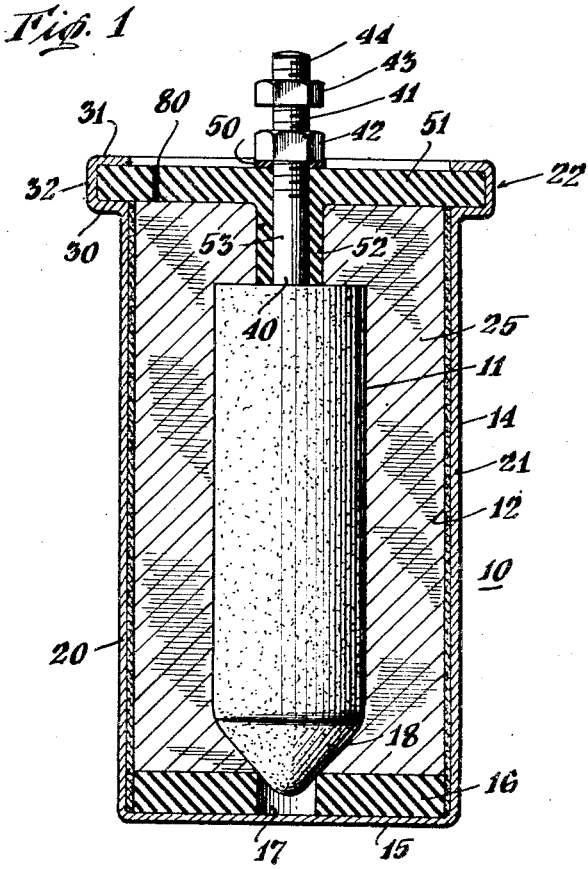

June 7, 1955 — J. M. BOOE — 2,710,369
ELECTROLYTIC CONDENSER
Filed Sept. 29, 1952

INVENTOR.
James M. Booe
BY
Nicholas Laugh
ATTORNEY

United States Patent Office 2,710,369
Patented June 7, 1955

2,710,369

ELECTROLYTIC CONDENSER

James M. Booe, Indianapolis, Ind., assignor to P. R. Mallory & Co., Inc., Indianapolis, Ind., a corporation of Delaware Application September 29, 1952, Serial No. 311,993

7 Claims. (Cl. 317—230)

This invention relates generally to electrolytic devices and has specific application to such devices including means and methods for manufacturing the individual components therefor.

The present application is a continuation-in-part of my copending application Serial No. 107,789, filed July 30, 1949, now Patent No. 2,616,953.

Electrolytic devices embodying the invention may be advantageously employed in the form of electrolytic capacitors, or such, and includes an electrolyte which makes contact with a set of electrodes, one of which, commonly designated as an anode, comprises a body of metal adapted to have formed thereon a film whose function it is to act as the dielectric for the capacitor. The set of electrodes are, in the usual case, immersed within a suitable electrolyte determined by the metallic nature and structure of the electrodes.

The amount of capacitance and the efficiency of the capacitor, depends to a great extent in maintaining one of the electrodes, usually the cathode, free of dielectric film forming tendencies, since such a film formed on the cathode tends to decrease the capacity of the capacitor and lessen the efficiency thereof.

By the present invention an electrolytic capacitor is provided having a non-polarizable cathode electrode and possessing the electrical characteristics of a substantially perfect cathode. That is to say, the hereinafter described cathode utilized as an electrode for an electrolytic capacitor is substantially non-film forming, non-gassing and offers a minimum internal series resistance so as to give optimum operation of the capacitor.

This great advance in the electrolytic art is based upon the discovery that such an electrode may be obtained by utilizing a metal which is substantially chemically inert to the capacitor electrolyte but which can respond electrochemically to the flow of pulsating current through the electrolytic cell. It is found that the electrochemical response is obtained by dissolving the cathode metal during one part of a current cycle and redepositing the same metal ions from the electrolyte on to the cathode during another part of the current cycle. Capacitors constructed in accordance with this far reaching principle are free from the usual effect of capacitance in series as is the result when a film forming cathode is employed. These capacitors are also found to be free from the effect of gas evolution at the cathode developed by the use of strictly inert cathode materials.

It is, therefore, an object of the present invention to provide a novel electrolytic cell or capacitor adapted to operate over a wide ambient range of temperatures.

Still another object of the present invention is to provide an electrolytic capacitor adapted for use in extreme ranges of heat and cold, for example, from —60° C. to 200° C.

Another object of the present invention is to provide a new type of capacitor embodying the constructional features of a substantially perfect cathode exhibiting non-gassing and non-film forming tendencies.

Still another object of the present invention is to provide an electrolytic capacitor having a non-polarizable cathode possessing the electrical characteristics of a substantially perfect cathode.

Yet another object of the present invention is to provide in a capacitor an electrode which in the absence of a potential difference may remain chemically inert within its associated electrolyte, yet, may respond electrochemically to the flow of pulsating current therethrough.

Still another object of the present invention is to provide an electrolytic capacitor adapted for use over a wide range of temperatures and which includes an anode fabricated of tantalum metal and a non-polarizable cathode fabricated of metal selected from the group consisting of silver and copper.

The invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in connection with the accompanying figures of the drawing wherein like reference characters describe elements of similar function and wherein the scope of the invention is determined from the appended claims.

Figure 2:
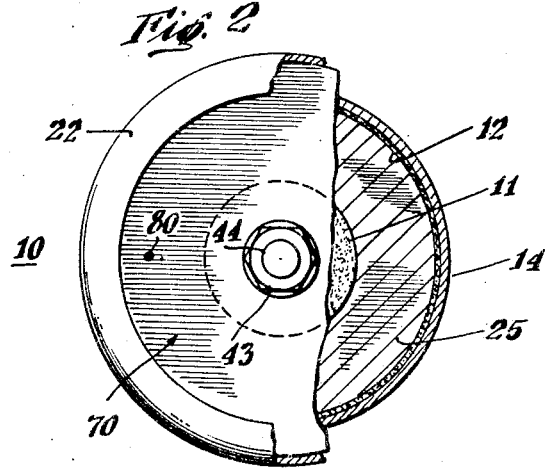

For illustrative purposes the invention will be described in connection with the accompanying drawing in which:

Figure 1 represents a vertical cross sectional elevational view on an enlarged scale of an electrolytic capacitor embodying the present invention; and Figure 2 represents a top elevational view, having a portion thereof broken away, of the electrolytic capacitor of the above embodiment of the invention as shown in Figure 1 thereof.

Generally speaking, the present invention describes a novel type of electrolytic cell or capacitor including a non-polarizable cathode fabricated of a metal selected from the group of copper and silver cooperatively operating with a tantalum anode immersed in an electrolyte, for example, sulfuric acid.

Electrolytic cells or capacitors constructed in accordance with the present invention may be adapted for use in polarized circuits and are able to accompany an alternating current component flowing therethrough in such manner as to store additional energy at the anode surface during the increasing voltage phase of the pulsating component and are enabled thereafter to dissipate this energy back to the circuit during the receding voltage phase of the pulsating current component.

Since at one time the cathode included in the electrolytic cell reacts with the electrolyte so as to dissolve metal ions therein with metal ions being reabsorbed by the cathode during the increasing voltage phase of the electric current, such electrochemical action at the cathode may be suitably termed "oscillating" and a cathode functioning in accordance therewith and in cooperation with a determined electrolyte may be termed "an oscillating cathode."

Referring now to the figures of the drawing which illustrate an embodiment of the invention, there is shown an electrolytic capacitor generally designated by reference numeral 10. Capacitor 10 has an electrode 11 which may be fabricated of tantalum, preferably of porous tantalum metal formed of tantalum particles pressed and sintered by powdered metallurgical procedures, and which herein is adapted to be used as an anode having a great surface area. A second electrode adapted to act as a cathode 12 of cell 10 is positioned within the cell at a distance preferably substantially equidistant from anode 11 so as to obtain equal electrochemical activity therebetween. Cell or capacitor 10 may have as its container a can 14, here shown as being a shell having cylindrical shape, but which shape is not to be taken as being definitive of the configuration thereof. Container 14 may be constructed of a metal, for example, copper and has a non-porous plating of a metal, herein described and shown as being silver, formed on the inside of, nominally, side walls 20 and 21 thereof. Of course, the silver plating may be omitted when it is desired to operate the capacitor with a copper cathode.

At the bottom wall 15 of container 14 there is positioned rubber insert 16 which is adapted to locate or anchor anode 11 within a bore or opening 17 thereof as by means of a tapered tip section 18 of anode 11. The top of container 14 is formed of an annular C-shaped collar 22 comprising horizontal parallel wall and lip sections 30 and 31, respectively, which sections extend in an outward direction from the side walls and are interconnected by means of vertical side wall section 32. Between anode 11 and its associated cathode 12 there is interposed an electrolyte 25 herein stated as being sulfuric acid, which may be in the free-flowing condition or in the immobilized or gel form. In the gel form a gelling agent is used in the electrolyte which is not adversely affected by the electrolyte, for example, silica gel. This is incorporated into the electrolyte as ethyl silicate which hydrolyzes to a gel of silicic acid.

Tantalum electrode 11 has connected thereto a stem or rod 40 which may be fabricated of tantalum and integrally formed therewith. Rod or stem 40 is threaded at its topmost portion as by means of thread 41 adapted to receive nuts 42 and 43 in a manner as hereinafter described. A tip 44 of rod 40 is adapted to act as an electrode terminal in the operation of the cell. The porous tantalum anode 11 has a threaded stem 40 screwed through the top 70 of container 10 and screws 42 and 43 are tightened thereupon. A seal preferably of cement 50 is made between screw 42 and the top of the container. The top or cover 70 of the container comprises an annular T-shaped stopper having a top annular section 51 made, for example, of hard rubber and is intimately contained by collar 22 on extension 30 as by means of lip 31 thereof. Integrally connected to hard rubber section 51 is a rubber washer seal 52 which substantially circumscribes section 53 of tantalum stem 40. A vent 80 adapted for use in the cell as a pressure escapement valve is formed to penetrate cover 70 so that beyond a predetermined pressure, excessive pressures may be released externally from the cell.

In the operation of the electrolytic capacitor, above described, there is found that on the receding voltage phase of the pulsating current component acting thereon, the metal from the cathode is dissolved in amounts electrochemically equivalent to the amount of current flowing in that phase so as to produce metal ions of the cathode metal in the electrolyte. During the increasing phase of the pulsating current component, it is found that the metal ions of the cathode are redeposited thereupon in amounts electrochemically equivalent to the amount of current flowing during that portion of the current cycle.

The described electrolytic capacitor including anodes of a condensed area type, herein shown as being fabricated of tantalum metal has the great advantage of using an "oscillating cathode" whose area is small as compared to the area of the anode. The electrolytic capacitor operates with uniform characteristics and cooperates with the electrolyte of sulfuric acid in such a manner that an asymmetrical conducting film is not formed on the cathode; and further the cathode does not suffer any undue chemical attack by the electrolyte but normally remains substantially inert with reference thereto. Further in the operation of the present electrolytic capacitor any non-conducting corrosion products of the cell do not accumulate on the cathode and such gases as oxygen and hydrogen are not liberated at the cathode due to the flow of pulsating electric current.

In my above-mentioned co-pending application Serial No. 107,789, it is disclosed that a copper cathode in conjunction with a tantalum anode in a sulfuric acid electrolyte provides an electrolytic capacitor in which the electrical losses at the cathode are minimized. This is due to the fact that the flow of alternating current through the capacitor dissolves copper from the cathode to form copper sulfate ions in the electrolyte during one-half cycle and redeposits these ions back onto the cathode as metallic copper during the other half cycle. This process is repeated during each cycle of the alternating current. Since capacitors of this type are operated with a direct current bias potential, the circuits in which they are generally employed have an alternating current component superimposed on the direct current potential. It is this alternating current which must be handled by the capacitor in the most efficient manner. This implies that the electrical losses in the capacitor must be kept at a minimum. One of the common sources of such electrical losses is at the cathode-electrolyte interface. When current flows through this interface, electrochemical reactions will occur according to Faraday's law so that one of the following conditions may exist:

1. Insoluble products of high resistance may be formed on the surface of the cathode which would contribute to electrical losses.
2. Gases may be formed on the surface of the cathode which would also contribute to electrical losses.
3. Assymmetric conducting films may be formed on the surface of the cathode which would exhibit a capacitance of its own and in series with the capacitance of the anode, thereby reducing the overall capacitances of the unit.
4. The cathode metal may dissolve in the electrolyte in proportion to the amount of current flowing in one direction and redeposit on the cathode in proportion to the amount of current flowing in the opposite direction. This represents the ideal condition for minimizing the losses and, in accordance with the principles of the present invention, may be realized by the use of a copper cathode. During the part of the alternating cycle when the potential on the anode is increasing, the current is in such direction as to deposit metal ions from the electrolyte onto the cathode as metal and during the receding part of the alternating cycle the current is in such direction as to dissolve metal from the cathode to form metal ions in the solution, such as copper sulfate in the sulfuric acid electrolyte.

I have found that in electrolytic capacitors comprising a tantalum anode and a copper cathode in a sulfuric acid electrolyte, the addition of copper ions to the electrolyte is extremely beneficial in that such addition greatly reduces the electrical losses at the cathode-electrolyte interface, thereby correspondingly increasing the capacitance of the unit. The electrolyte may be either in the immobilized or in the free flowing condition. Although some copper ions are produced in the electrolyte by the abovementioned alternating current, the leakage current of the capacitor is in such direction as to tend to deplete the solution of copper ions. In other words, no appreciable copper ion concentration would be built up in the electrolyte. By the addition of copper ions, the presence of such ions in the electrolyte is assured.

Broadly stated, the addition of copper ions, such as copper sulfate ions, to the sulfuric acid electrolyte may be between 10% to 100% of saturation. The beneficial effect of the presence of copper ions generally increases with the concentration of such ions in the electrolyte so that in many cases it is preferred to saturate the sulfuric acid electrolyte with copper sulfate.

In order that those skilled in the art may have a better understanding of the invention, the following table may be given indicating the effect of the presence of various concentrations of copper sulfate in the sulfuric acid electrolyte, such effect being made manifest by the amount of capacitance exhibited by the tantalum anode. The same anode was used in all tests, namely a 500 mfd. anode formed at 15 volts, such anode being selectively used in combination with three copper cathodes of different size having areas of .132 sq. in., .259 sq. in. and .514 sq. in., respectively. In all cases the electrolyte was 40% sulfuric acid by weight. All measurements were made with 3 volts A. C. measuring current on a Wien bridge with 10 volts D. C. bias potential applied.

| Area of Copper Cathode | Capacitance in Mfd. | Percent Saturation of Electrolyte with Copper Sulfate | Percent by Weight of Copper Sulfate in Electrolyte |
|---|---|---|---|
| .132 sq. in | 82 | 0 | 0 |
| .259 sq. in | 112 | 0 | 0 |
| .514 sq. in | 152 | 0 | 0 |
| .132 sq. in | 215 | 12.5 | .337 |
| .259 sq. in | 250 | 12.5 | .337 |
| .514 sq. in | 285 | 12.5 | .337 |
| .132 sq. in | 280 | 25 | .675 |
| .259 sq. in | 350 | 25 | .675 |
| .514 sq. in | 400 | 25 | .675 |
| .132 sq. in | 300 | 50 | 1.35 |
| .259 sq. in | 370 | 50 | 1.35 |
| .514 sq. in | 440 | 50 | 1.35 |
| .132 sq. in | 360 | 75 | 2.3 |
| .259 sq. in | 415 | 75 | 2.3 |
| .514 sq. in | 480 | 75 | 2.3 |
| .132 sq. in | 370 | 100 | 3.0 |
| .259 sq. in | 420 | 100 | 3.0 |
| .514 sq. in | 495 | 100 | 3.0 |

From the foregoing table, it is quite evident that the presence of copper ions in the electrolyte in adequate amounts decreases the electrical losses at the copper cathode thus enabling the full capacitance of the anode to be exhibited. It is also evident that an adequate amount of copper ions in the electrolyte permits the use of a copper cathode of smaller area for obtaining the same capacitance. This is of considerable importance when it is desired to reduce the dimensions of a tantalum capacitor of predetermined capacitance to a minimum. The use of an adequate amount of copper ions in the electrolyte also enables the capacitor to handle alternating current ripples of a much higher magnitude. This is especially important where the cathode area is quite small.

Although the present invention has been disclosed in connection with a few preferred embodiments thereof, variations and modifications may be resorted to by those skilled in the art without departing from the principles of the invention. Thus, when it is desired to operate the tantalum capacitors of the invention at high temperatures up to 200° C., it is preferred to form the insulating and sealing members thereof from a material which can be exposed to such temperatures for long periods of time without deterioration. Examples of materials suitable for the purpose are Teflon (polymerized tetrafluoroethylene) and Kel-F (polymerized chlorotrifluoro ethylene). I consider all of these variations and modifications to be within the true spirit and scope of the present invention, as disclosed in the foregoing description and defined by the appended claims.

I claim:

1. An electrolytic capacitor comprising, in combination, an anode of tantalum having a dielectric film formed thereon, a cathode of copper, and an electrolyte of sulfuric acid interposed between and in contact with said anode and cathode, said electrolyte containing an appreciable amount of copper ions dissolved therein.

2. An electrolytic capacitor comprising, in combination, a porous anode of tantalum having a dielectric film formed thereon, a cathode of copper, and an electrolyte of sulfuric acid interposed between and in contact with said anode and cathode, said electrolyte containing copper sulfate in an amount between 10% and 100% of saturation.

3. An electrolytic capacitor comprising, in combination, a porous anode of tantalum having a dielectric film formed thereon, a cathode of copper, and an electrolyte of sulfuric acid substantially saturated with copper sulfate interposed between and in contact with said anode and cathode.

4. An electrolytic capacitor comprising, in combination, a copper shell constituting the cathode of the capacitor, a sintered porous body of tantalum having a dielectric film formed thereon in said shell constituting the anode of the capacitor, an electrolyte of sulfuric acid containing appreciable amounts of copper sulfate in said shell and in contact with said anode and cathode, and closure means mounted for cooperation with said shell and forming therewith a sealed enclosure for the cell.

5. An electrolytic capacitor comprising, in combination, an anode of porous tantalum having a dielectric film formed thereon, a cathode of copper and an electrolyte of sulfuric acid containing copper sulfate in appreciable amounts interposed between and in contact with said anode and cathode, said copper cathode being capable of responding to the flow of current through the capacitor in one direction by the dissolution of copper in the electrolyte and of responding to the flow of current through the capacitor in the opposite direction by the deposition of copper from the electrolyte.

6. An electrolytic capacitor comprising, in combination, an anode of porous tantalum having a dielectric film formed thereon, a cathode of copper and an electrolyte of sulfuric acid substantially saturated with copper sulfate interposed between and in contact with said anode and cathode, said copper cathode being capable of responding to the flow of current through the capacitor in one direction by the dissolution of copper in the electrolyte and of responding to the flow of current through the capacitor in the opposite direction by the deposition of copper from the electrolyte.

7. An electrolytic capacitor comprising, in combination, an anode of tantalum having a dielectric film thereon, a cathode of copper, and an electrolyte of sulfuric acid containing copper sulfate in an amount between 10% and 100% of saturation interposed between and in contact with said anode and said cathode, said cathode being non-film-forming and non-polarizing in and normally chemically inert to the electrolyte but being capable of responding to the flow of current through the capacitor in one direction by the dissolution of copper in the electrolyte and of responding to the flow of current through the capacitor in the opposite direction by the deposition of copper from the electrolyte in amounts electrochemically equivalent to the amount of current flowing through the capacitor.

References Cited in the file of this patent

UNITED STATES PATENTS

| 1,714,319 | Ruben | May 21, 1929 |
| 2,060,022 | Brennan | Nov. 10, 1936 |
| 2,359,970 | Clark | Oct. 10, 1944 |

FOREIGN PATENTS

| 355,965 | Great Britain | Sept. 3, 1931 |
| 385,923 | Germany | July 17, 1920 |